June 15, 1937. H. A. HALL 2,083,992
PROPELLER
Filed June 19, 1936 2 Sheets-Sheet 2

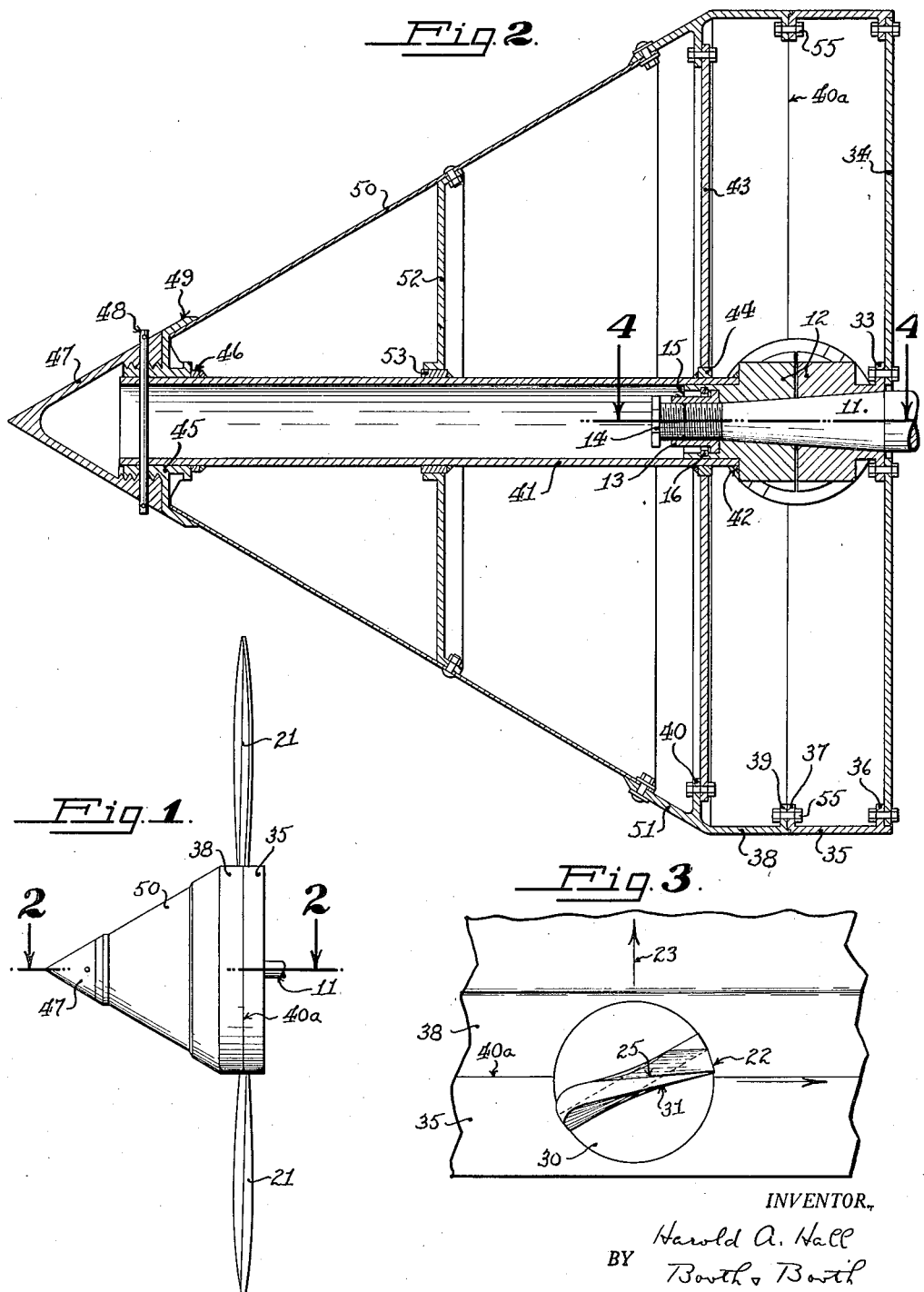

INVENTOR.
Harold A. Hall
BY Booth & Booth
ATTORNEYS.

Patented June 15, 1937

2,083,992

UNITED STATES PATENT OFFICE 2,083,992

PROPELLER

Harold A. Hall, Los Gatos, Calif.

Application June 19, 1936, Serial No. 86,091

6 Claims. (Cl. 170—177)

The present invention relates to aircraft propellers, and has for its principal object the provision of an improved form of propeller whereby efficiency is increased, and manufacturing and maintenance costs are reduced.

A second object of the invention is to provide an improved hub, by means of which the blades are held securely, and yet may be turned in their sockets to set them at any desired pitch angle.

A further object is to provide a shield or spinner of substantial but light construction, which incloses and stream-lines the hub and the central portion of the propeller to lessen the parasitic air resistance thereof. Still other objects and advantages of the invention will become apparent from the following specification, which should be read with the understanding that changes may be made, within the scope of the claims hereto appended, in the form, construction and arrangement of the several parts herein described and illustrated, without departing from the spirit of the invention.

Reference will be made to the accompanying drawings, in which

Fig. 1 is a side elevation of my propeller.

Fig. 2 is a longitudinal section taken on the line 2—2 of Fig. 1 and enlarged.

Fig. 3 is an end elevation of one blade, showing a portion of the central shield.

Figure 5:
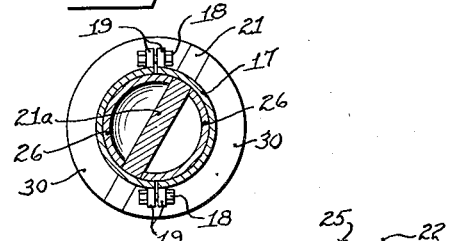
Fig. 5 is a transverse section through the shank and mounting of one blade, taken on the line 5—5 of Fig. 4.

The propeller may have two or more blades as desired, but for purposes of illustration I have shown it with two blades only. The reference numeral 11, Figs. 2 and 4, designates the end of the propeller shaft, which is shown as tapered, and may be provided with the usual key, not shown. The hub 12 is split in a plane at right angles to the axis of rotation, and both halves are fitted consecutively upon the tapered end of the shaft, and held thereon by a nut 13 provided with a locking jam plug 14. The outer end of the hub is recessed, as shown at 15, and is provided with a split ring 16 against which the flange of the nut 13 bears, when unscrewed, to pull the hub loose from the tapered shaft.

Figure 4:
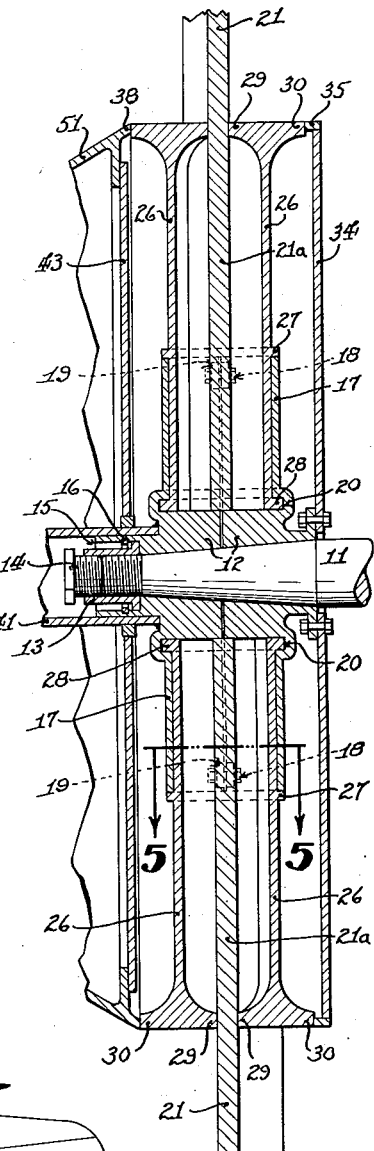
Fig. 4 is a longitudinal section taken on the line 4—4 of Fig. 2.

The hub 12 has two opposite radially disposed projecting cylindrical sockets 17, Fig. 4, in which the shanks of the blades are seated. These sockets are split in the same plane as the hub, one semi-cylindrical half of each socket being formed integrally with the corresponding half of said hub. The outer ends of the split sockets are clamped together by bolts 18, Figs. 4 and 5, extending through projecting ears 19. Their inner ends are held together by the shaft nut 13. At the inner ends of said sockets, where they join the hub, they are provided with interior annular grooves 20, Fig. 4.

Figure 6:
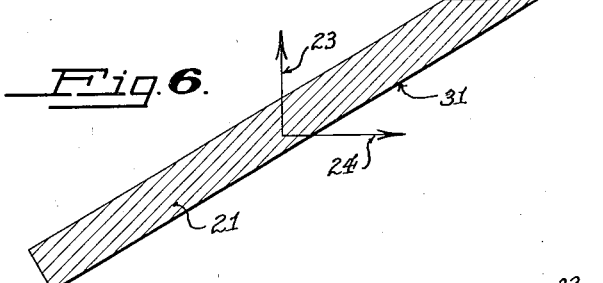
Fig. 6 is a transverse section of one blade, taken near its shank on the line 6—6 of Fig. 9.
Figure 7:
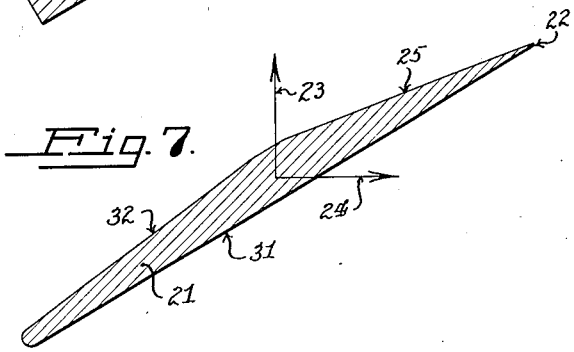
Fig. 7 is a transverse section of a blade of slightly modified shape, taken approximately midway between the shank and the outer end or tip.
Figure 8:
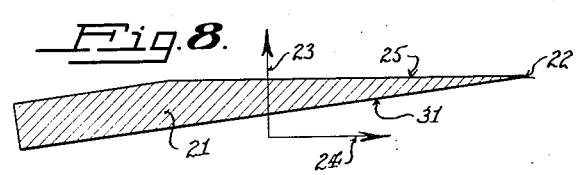
Fig. 8 is a transverse section of the same blade as in Fig. 6, taken near its tip on the line 8—8 of Fig. 9.
Figure 9:
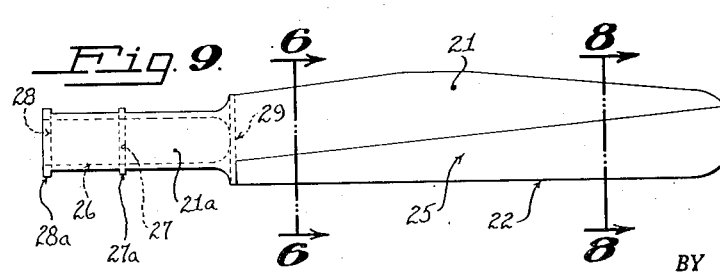
Fig. 9 is a rear elevation, reduced in size, of the blade shown in section in Figs. 6 and 8.

The blade proper 21 is formed from a flat piece, preferably of steel, beveled to a sharp leading edge 22, as shown in Figs. 6, 7 and 8, in which the direction of flight is indicated by the arrow 23, and the direction of rotation of the blade by the arrow 24. The bevel 25 which produces the sharp leading edge does not extend all the way to the base of the blade, leaving a shank portion 21a of reduced width and rectangular section, as shown in Figs. 5 and 9. This flat rectangular shank portion is interposed between two semi-cylindrical hollow filler members 26, the edges of said members being preferably welded to the blade, and forming with it a unitary cylindrical shank. The filler members 26 are provided with spaced annular flanges 27 and 28, the latter being at their inner end, and the shank portion of the blade is provided with corresponding projections 27a and 28a whereby the flanges of the built-up cylindrical shank are made continuous. After being welded to the blade, the members 26 are turned down in a lathe to fit snugly within the socket 17, the flange 27 resting against the end of said socket, and the flange 28 seating within the groove 20 at the base thereof, as shown in Fig. 4.

When the bolts 18 and the shaft nut 13 are loose, the blades can be turned in the sockets 17 to the desired pitch angle, but when said bolts and said shaft nut are tightened, the shanks of the blades are tightly clamped in said sockets to prevent any possible turning movement. Endwise thrust due to centrifugal force is resisted by the flanges 28 seated in the grooves 20. The outer ends of the shank members 26 fit snugly against the flat faces of the blade throughout its entire width, as shown at 29, and are preferably welded thereto. They also have an outer annular flange 30, whose purpose will appear presently.

The bevel 25, which produces the sharp leading edge of the blade, is formed upon its back, and increases in width from the outer end of the shank to the tip or outer end of the blade, where said blade is wedge-shaped, as shown in Figs. 3, 6, 8 and 9. At the same time the blade is twisted slightly, as shown best in Fig. 3, to reduce the pitch angle of the pressure face 31 at said outer end. The plane of said bevel 25 therefore remains approximately perpendicular to the line of flight, which is its best position. The portion of the back of the blade near the trailing edge can also be beveled if desired, as shown at 32 in Fig. 7, to decrease weight, although I have found by actual experiment that efficiency is increased much more by beveling the leading edge than the trailing edge.

In order to reduce the parasitic air resistance of the central portion of the propeller, I provide a shield as shown in Figs. 1 and 2, whose diameter at its rear is large enough to inclose the shanks of the blades, thus leaving only their effective portions exposed. The hub 12 has a rear flange 33, Fig. 2, to which is bolted a circular plate 34. An annular drum-like member 35 is provided with internal flanges 36 and 37 at its edges, its rear flange 36 being bolted to the plate 34. A second drum 38 is provided with internal flanges 39 and 40, its rear flange 39 being bolted to the front flange 37 of the first drum. The joint 40a between the drums 35 and 38 is approximately in the plane of the split in the hub 12.

A centrally disposed tube 41 extends forwardly from the hub 12, and is secured thereto, preferably by brazing or welding at 42. A plate 43 is bolted to the forward flange 40 of the drum 38, and its center has a sliding fit about a collar 44 secured upon the tube 41. The forward end of the tube carries a sliding fit bushing 45, seated against a collar 46. A conical cap 47 is screwed upon the outer end of the bushing 45 and a transverse pin 48 secures both cap and bushing in position. The bushing has a conical rearwardly turned flange 49 which fits over a light conical member 50. Said member extends rearwardly and is bolted to the forward conical end 51 of the drum 38. A transverse bracing plate 52 is preferably positioned about midway of the length of the member 50, the outer edge of said plate being bolted to said member and its center being a sliding fit upon a collar 53 secured upon the tube 41.

The flanges 30 at the outer ends of the shanks of the blades extend into and fill circular openings in the drums 35 and 38, as shown in Figs. 3 and 4, so that the peripheries of said drums present a smooth and continuous exterior. The rear plate 34 is provided with hand holes, not shown, or is formed as a spider, to give access to the clamping bolts 18 of the blade shanks and the bolts 55 which hold the two drum portions together. The other plates 43 and 52 may also be formed as spiders to save weight.

When it is necessary to remove and replace a blade, the two drum portions are unbolted at 55, the cap 47 is removed, and the conical portion of the shield and the drum 38 are slipped off forwardly, the two drum portions separating at the joint 40a. The bolts 18 of the blade sockets are then taken out and the forward half of the hub 12 is removed by unscrewing the nut 13 with a socket wrench inserted through the tube 41. The blades can then be lifted out. If the entire propeller is to be removed from the shaft, it is only necessary to take off the cap 47 and unscrew the shaft nut 13, the entire shield coming off with the hub and blades.

It will be seen from the foregoing description that my construction provides a simple, efficient, and inexpensive form of blade; that the blades are securely held in the hub to prevent them from working loose; that their pitch angle can be set at any desired value; and that a shield is provided for stream-lining the central region of the propeller which is solidly mounted to prevent working loose, and yet which can be removed easily when necessary.

I claim:

1. In combination with a propeller shaft, a hub mounted thereon, a tubular member extending forwardly from said hub, means accessible through said tubular member for holding said hub upon said shaft, a blade extending from said hub, a substantially conical shield having its apex carried by said tubular member, said shield inclosing said hub and the inner end portion of said blade and being removable forwardly, and means for supporting the rear end of said shield from said hub.

2. In combination with a propeller shaft, a hub mounted thereon, blades carried by said hub, a tubular member extending forwardly from said hub, means accessible through said tubular member for holding said hub upon said shaft, and a substantially conical shield inclosing said hub and the bases of said blades, the apex of said shield being carried by said tubular member.

3. An air propeller comprising a hub, blades extending therefrom, a forward extension secured to said hub and aligned with the axis thereof, a member extending transversely from said extension and longitudinally slidable thereon, a substantially conical shield secured to said transverse member, the apex of said shield being carried by the forward end of said extension and said shield and said transverse member being removable endwise from said extension.

4. An air propeller comprising a hub, blades extending therefrom, a forward extension secured to said hub and aligned with the axis thereof, a member extending transversely from said extension and longitudinally slidable thereon, a substantially conical shield secured to said transverse member, the apex of said shield being carried by the forward end of said extension and said shield and said transverse member being removable endwise from said extension, and a rearward extension of said shield separable therefrom, said shield and its rearward extension being connected together approximately in the transverse plane of said blades.

5. An air propeller comprising a hub having a blade holding socket, a substantially flat blade, a filler member secured to each wider face of said blade at its inner end, said filler members and the inner end portion of said blade forming a shank seated in said socket, the outer ends of said filler members forming transverse shoulders separating the shank portion of said blade from its effective portion, a shield inclosing said hub and the shank portion of said blade to reduce the air resistance thereof, said shield having an aperture through which said blade extends, the shoulders of said blade being approximately flush with the surface of said shield and forming a closure for said aperture.

6. An air propeller comprising a hub, a blade extending therefrom, said blade having a substantially flat effective portion and a transverse shoulder at the inner end thereof, a shield inclosing said hub to reduce the air resistance thereof, said shield having an aperture through which said blade extends, the shoulder of said blade being approximately flush with the surface of said shield and forming a closure for said aperture.

HAROLD A. HALL.